United States Patent [19]
Kunimi et al.

[11] Patent Number: 5,410,484
[45] Date of Patent: Apr. 25, 1995

[54] AUTOMATIC BRAKE CONTROL SYSTEM

[75] Inventors: Takashi Kunimi, Tokyo; Kimio Takahashi, Kasukabe; Katsuya Miyake, Konosu, all of Japan

[73] Assignees: Akebono Brake Industry Co., Ltd., Tokyo; Akebono Research and Development Centre, Ltd., Saitama, both of Japan

[21] Appl. No.: 893,743

[22] Filed: Jun. 5, 1992

[30] Foreign Application Priority Data

Jun. 5, 1991 [JP] Japan .............................. 3-042169 U
Jun. 19, 1991 [JP] Japan .................................. 3-147633

[51] Int. Cl.⁶ .............................................. B60T 8/32
[52] U.S. Cl. ......................... 364/426.01; 364/426.04; 180/170
[58] Field of Search ...................... 364/426.01, 426.04, 364/424.05; 180/169, 170; 340/904

[56] References Cited
U.S. PATENT DOCUMENTS 4,600,913 7/1986 Caine .................................. 340/104
5,091,726 2/1992 Shyu ..................................... 340/904
5,189,619 2/1993 Adachi et al. .................. 364/426.04
5,197,562 3/1993 Kakinami et al. ..................... 180/169
5,278,764 1/1994 Iizuka et al. ........................ 364/461

FOREIGN PATENT DOCUMENTS 71727 9/1985 Japan .

Primary Examiner—Kevin J. Teska
Assistant Examiner—Stephen J. Walder, Jr.
Attorney, Agent, or Firm—Knobbe, Martens, Olson & Bear

[57] ABSTRACT

In a vehicular automatic brake system, a distance X between a vehicle to be controlled and an obstacle is determined using a distance sensor, a relative velocity Vs with respect to the obstacle is determined from changes of X with time, a judgment is made as to whether the vehicle to be controlled is approaching the obstacle, further, an estimated time Tx which will be taken until contact with the obstacle is determined from Vs and X, and braking is performed in accordance with the value of Tx.

7 Claims, 4 Drawing Sheets

AUTOMATIC BRAKE CONTROL SYSTEM

BACKGROUND OF THE INVENTION

The present invention relates to an automatic brake control system for controlling the running speed of a vehicle automatically.

As this type of an automatic brake control system there is known the system described in Japanese Patent Laid Open No. 71727/87.

In such automatic brake control system, the distance between a front obstacle such as a vehicle and a vehicle to be controlled is detected and the vehicle to be controlled is braked on the basis of the result of the detection. In the case where the distance from the obstacle is judged to be sufficient for safe running on the basis of the result of comparison between a reference running speed which is determined from a vehicular running speed at the start point of the braking and a vehicular running speed during the above braking operation, the braking is released.

In such prior art, however, in many cases there occurs discrepancy between the braking action and the actual driving sense.

More particularly, in a conventional automatic braking system, braking is not performed as long as the distance up to a front vehicle does not reach a predetermined distance, on the basis of only the running speed of a vehicle to be controlled (hereinafter referred to as "this vehicle"), irrespective of whether the running speed of the front vehicle is high or low, if only the running speed of this vehicle is constant.

Consequently, in the case where the running speed of the front vehicle is sufficiently high and the front vehicle and this vehicle are in a relation such that the distance between both vehicles becomes smaller gradually, braking is performed with a sufficient time margin, but when the front vehicle is braked suddenly or is at a standstill, there is little time margin, thus causing a danger of rear-end collision.

Conversely, if a braking start distance is determined, premising sudden braking or stopping of the front vehicle, the braking will be started in a too early stage, causing a danger against a succeeding vehicle rather than this vehicle, even when vehicles are running smoothly and the running speed of the preceding vehicle is sufficiently high.

The present invention has been accomplished in view of the above-mentioned problem and it is the object of the invention to provide a technique which permits a braking operation to be performed in a state closer to the actual driving sense in an automatic brake control system.

SUMMARY OF THE INVENTION

According to the present invention, in an automatic brake control system including a distance sensor for detecting the distance between a front vehicle and this vehicle, a brake pressure controller, and a control section which inputs a signal from the distance sensor, performs an arithmetic processing and outputs a control signal to the brake pressure controller, first a distance X between this vehicle and an obstacle is determined, then a relative velocity Vs with respect to the obstacle is determined from changes in the distance X with the lapse of time, a judgment is made as to whether this vehicle is approaching the obstacle, further, an estimated time Tx which will be taken till contact with the obstacle is determined from both Vs and X, and braking is performed on the basis of the value of Tx.

According to the present invention, since the estimated time Tx up to contact with a front vehicle is calculated and braking is performed in accordance with the value obtained, braking is applied irrespective of the distance between the front vehicle and this vehicle if the running speed of the front vehicle is low even when the running speed of this vehicle is constant, while if the running speed of the front vehicle is high, braking is applied in a stage in which the vehicle-to-vehicle distance has become shorter. In this way, a braking operation is performed in a state extremely close to the actual driving sense.

DESCRIPTION OF THE PREFERRED EMBODIMENTS

Embodiment 1

Figure 1:
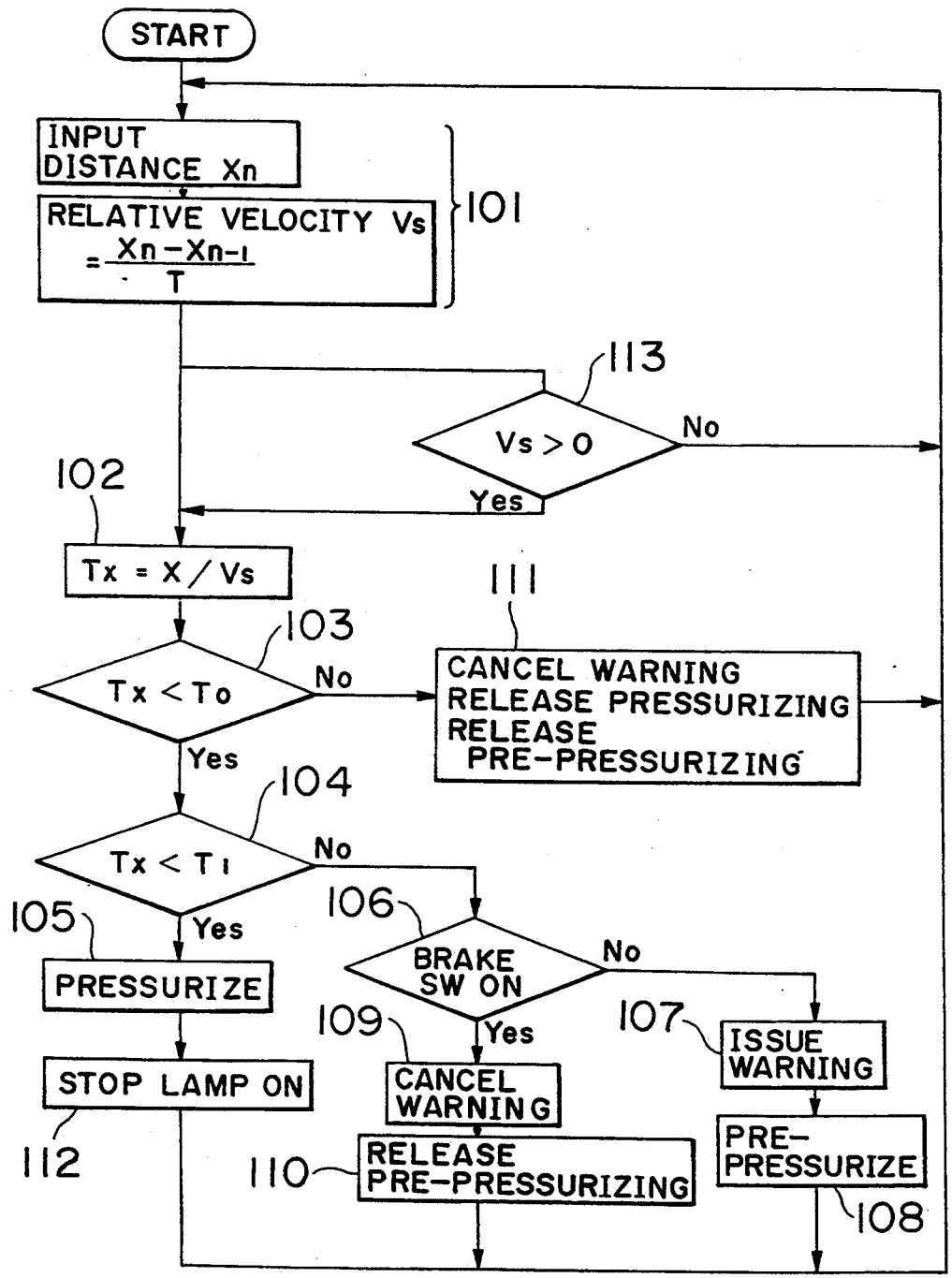
FIG. 1 is a flowchart showing an automatic brake control according to an embodiment of the present invention.

An embodiment of the present invention will be described below with reference to FIGS. 1 to 3.

Figure 3:
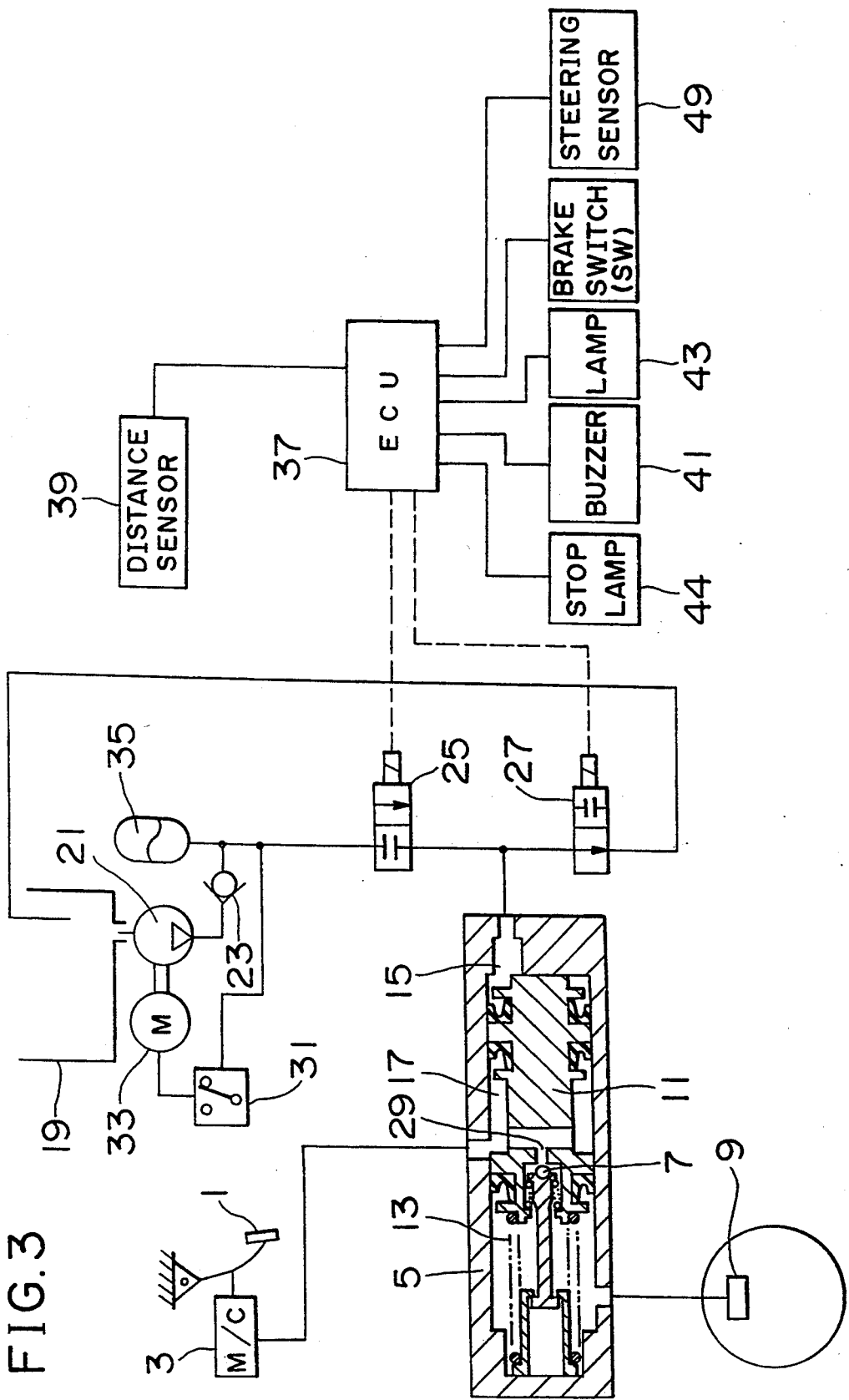
FIG. 3 is a block diagram of an automatic brake control system according to the embodiment of the invention.

FIG. 3 is a block diagram of an automatic brake control system according to an embodiment of the present invention.

In this embodiment, upon depression of a brake pedal 1, a master cylinder 3 sends a hydraulic brake fluid to a pressure accumulating device 5 and further to a wheel cylinder 9 through a passage 29 formed in a piston 11 which is provided within the pressure accumulating device 5, allowing the fluid to exhibit a braking force and effect an actual braking operation.

The piston 11 disposed within the pressure accumulating device 5 is normally urged rightwards in the figure by means of a spring 13.

A port 15 is formed on the right-hand side of the piston 11 in the figure, and when a control fluid, e.g. air, which will be described later is fed into the pressure accumulating device through the port 15, the piston 11 is moved leftwards in the figure against the biasing force of the spring 13. Centrally of the piston 11 is formed a chamber 17, into which is fed the hydraulic brake fluid from the master cylinder. The chamber 17 and the left-hand space of the piston 11 are normally in communication with each other through the passage 29. In the passage 29 is disposed a check valve 7 constituted by a ball to prevent backward flowing of the hydraulic brake fluid from the wheel cylinder 9 during control which will be described later.

A control fluid such as air is delivered from a tank 19 by means of a pump 21, then passes through a check valve 23 and is stored in an accumulator 35.

When the internal pressure of the accumulator exceeds a predetermined level, a switch 31 turns off to stop the supply of electric power to a motor 33 and the operation of the pump 21 stops.

A hold valve 25 and a decay valve 27 are controlled by a control section 37. The hold valve 25 is constituted by a normally closed solenoid valve, while the decay valve 27 is constituted by a normally open solenoid valve.

The control section 37 controls the opening and closing the hold valve 25 and decay valve 27 which together function as a brake pressure controller, whereby it is made possible to control pressurizing, pressure holding and pressure reduction for the hydraulic brake fluid in the wheel cylinder 9 through the pressure accumulating device 5.

A distance sensor 39 is connected to the control section 37. As the distance sensor 39 there is used a sensor which utilizes ultrasonic wave, laser beam, image processing, or infrared ray.

The control section 37 uses a buzzer 41 or a lamp 43 for giving a warning to the driver, using light or sound.

A steering sensor 49 has a function of judging whether a steering operation is being performed or not.

The control made by the control section 37 will be described below with reference to FIG. 1.

First, the distance $X_N$ from an obstacle, e.g. a front vehicle, is determined by the distance sensor 39 of this car.

The distance $X_N$ is obtained at every operation cycle T, and a relative velocity Vs with respect to the front vehicle is determined from changes of $X_N$ with time (step 101). Judgment is made as to whether the value of the relative velocity Vs is positive or negative for judging whether this vehicle is approaching the front vehicle (step 113).

If it is judged in step 113 that this vehicle is approaching the front vehicle, there is calculated an estimated time Tx which will be taken until contact, or rear-end collision, with the front wheel, from both the relative velocity Vs and the distance $X_N$ (step 102).

If Tx is smaller than a predetermined value $T_0$ (step 103) and also smaller than $T_1$ ($T_1 < T_0$) (step 104), the hold valve 25 is opened and the decay valve 27 is closed, thereby allowing the control fluid in the accumulator 35 to be fed into the port 15 of the pressure accumulating device 5.

As a result, the piston 11 moves leftwards in the figure, whereby the hydraulic brake fluid in the pressure accumulating device 5 is fed into the wheel cylinder 9 to pressurize the cylinder, thus effecting a braking operation (step 105). At the same time, stop lamps 44 provided in rear positions of the vehicle come on (step 112).

When in step 103 the estimated time Tx is longer than the reference time $T_1$ (step 104) though it is shorter than the reference time $T_0$ (step 103), a judgment is made as to whether the brake pedal 1 has been depressed or not (step 106). If the brake pedal has not been depressed, the lamp 43 will blink and the buzzer 41 will sound, thus issuing a warning (step 107). At the same time, the hold valve 25 opens and the decay valve 27 closes for only a predetermined time. As a result, the piston 11 moves only a predetermined distance leftwards in the figure to deliver only a predetermined amount of the hydraulic brake fluid to the wheel cylinder 9 to pre-pressurize the cylinder (step 108).

Figure 2:
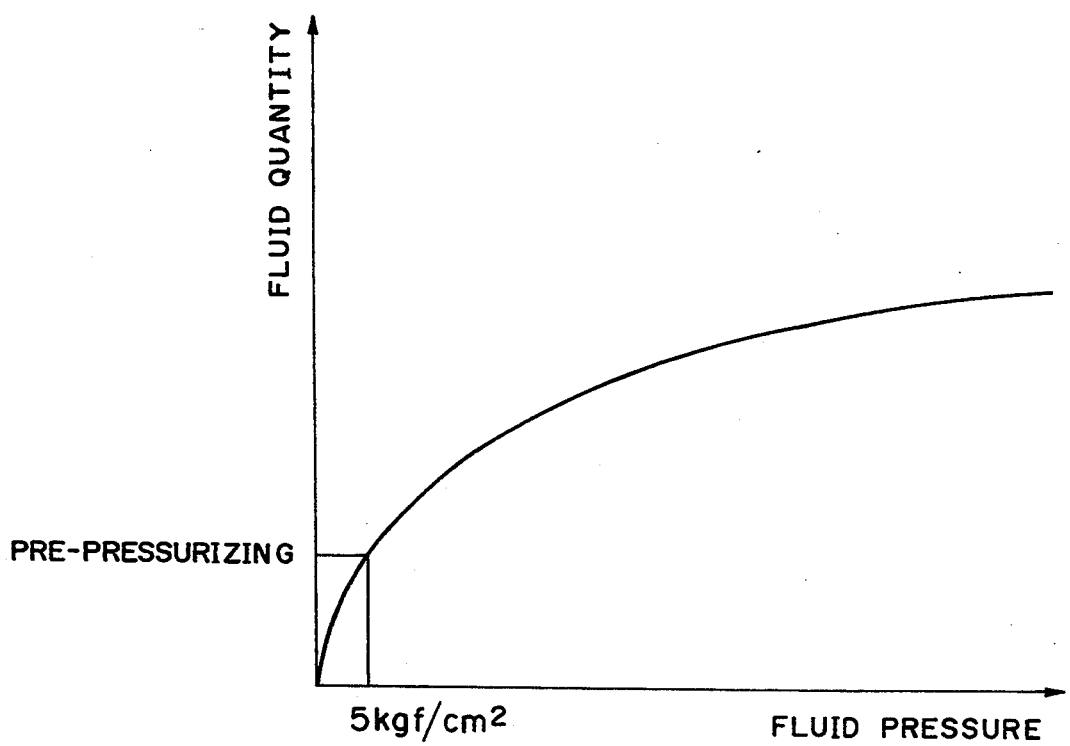
FIG. 2 is a graph showing a fluid quantity-fluid pressure characteristic for the explanation of pre-pressurizing in FIG. 1.

The said pre-pressurizing is performed until the fluid pressure in the wheel cylinder 9 becomes about 5 kgf/cm² so as to cause a light drag state of the brake as shown in FIG. 2. In the initial stage of pressurizing, as shown in the same figure, the increase of fluid pressure is small for the amount of fluid fed due to a brake shoe gap or the loss of the hydraulic brake fluid. Therefore, if a small amount of the hydraulic brake fluid is fed beforehand by such pre- pressurizing, it is possible to generate a sufficiently high fluid pressure at a small amount of the fluid in the subsequent main pressurizing operation, thereby permitting an improvement in the response characteristic of braking.

If the brake pedal has been depressed in step 106, the warning is cancelled (step 109), then the hold valve 25 is closed and the decay valve 27 opens for delivery of the control fluid from the port 15, so that the piston 11 moves rightwards in the figure under the action of the spring 13 and the pre-pressurizing is released (step 110).

Braking is performed by a leftward movement in the figure of the piston 11 (step 105) or by depression of the brake pedal 1, and if as a result the distance Tx is larger than $T_0$ (step 103), the warning is cancelled, the hold valve 25 closes and the decay valve 27 opens, allowing the control fluid to be discharged from the port 15, so that the piston 11 moves rightwards in the figure under the action of the spring 13 and the pre-pressurizing and main pressurizing are released (step 111).

At this time, once the piston 11 returns to the rightmost end, the check valve 7 opens to open the passage 29.

Embodiment 2

Figure 4:
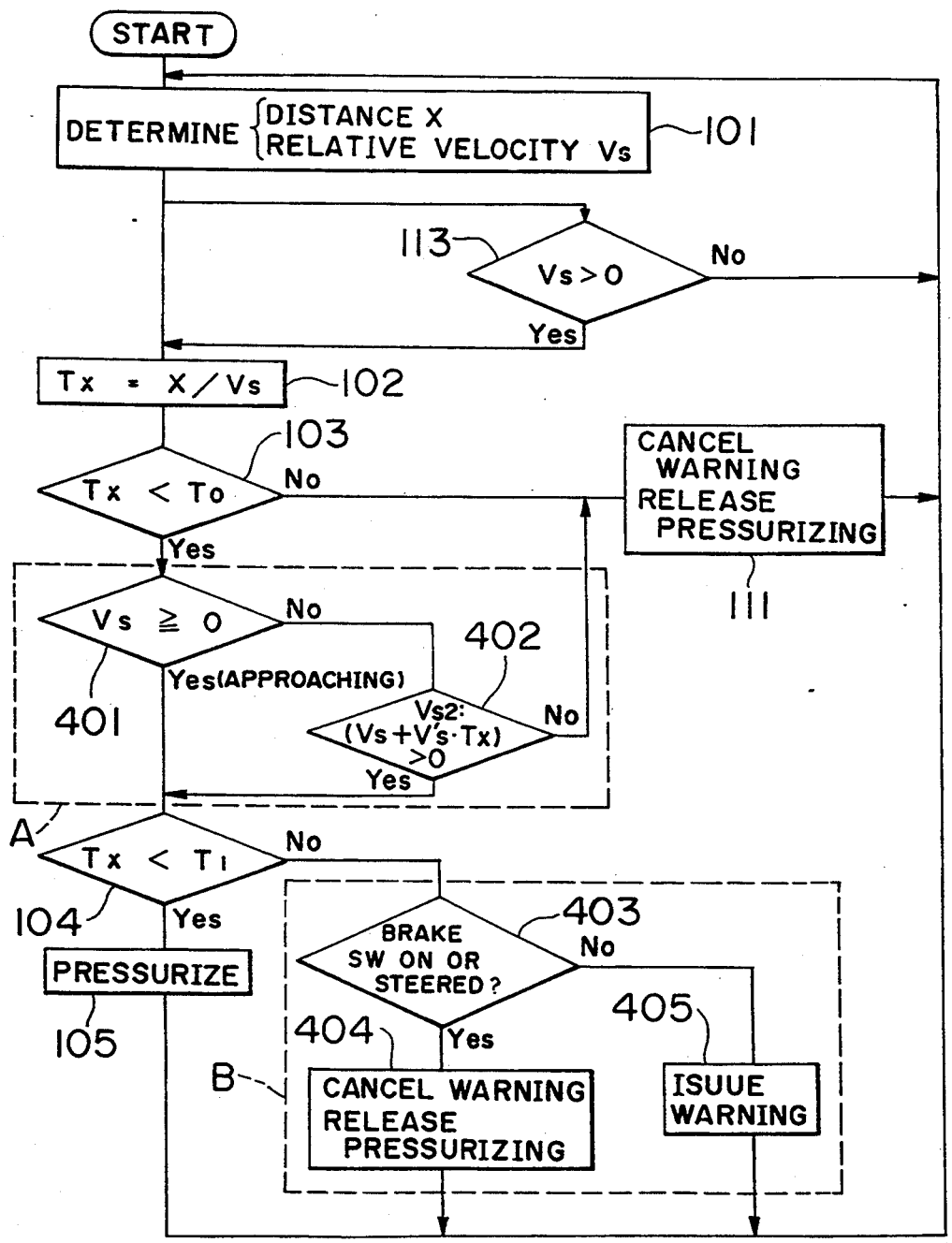
FIG. 4 is a flowchart showing an automatic brake control according to another embodiment of the present invention.

FIG. 4 shows an automatic brake control according to another embodiment of the present invention.

The flow of control made by the control section 37 in this embodiment 2 is different from that of the above embodiment 1 in that processings A and B which are enclosed with broken lines are added.

More specifically, a relative velocity Vs with respect to a front vehicle is calculated from changes of the vehicle-to-vehicle distance X with time (step 101), and if it is judged that this vehicle is approaching the front vehicle (step 113), an estimated time Tx until collision is calculated from both Vs and X (step 102), and after comparing the estimated time with a predetermined value $T_0$ (step 103), a relative acceleration V's is calculated from the relative velocity Vs, then judgment is made as to whether the value of the relative acceleration V's is positive or negative (step 401) and if it is positive, that is, if the speed is high, Vs and Tx are multiplied together and judgment is made as to whether a relative velocity $Vs_2$: (Vs+V's·Tx) is positive or negative at the time when the rear-end collision estimated time Tx has elapsed (step 402). If it is negative, the flow shifts to step 111 to cancel the warning and release the pressure.

According to such flow in processing B, even a relative velocity at the elapsed time point of the rear-end collision estimated time is judged, whereby unnecessary warning and application of pressure are avoided and hence any extra burden is imposed on the driver.

In the processing B, not only whether the brake pedal 1 has been depressed or not is judged, but also whether a steering operation is being performed or not is judged from a signal of a steering sensor 49 as shown in FIG. 3 (step 403). If the answer is affirmative, it is judged that the driver has the intention of avoiding collision, and the warning is cancelled and the application of pressure released (step 404).

On the other hand, when the brake pedal 1 is not depressed nor is performed a steering operation, a warning is issued (step 405). At this time, there may be conducted such pre-pressurizing (step 108 in FIG. 1) as described above in the embodiment 1.

According to the automatic brake control system of the present invention, as set forth in the above embodiments, a warning is issued and braking is performed in accordance with whether the estimated time Tx up to collision is larger or smaller than the predetermined value $T_0$ or $T_1$. Therefore, braking can be done in a state very close to the actual driving sense.

For example, consideration will now be given to two cases, in one of which the running speed of this vehicle is 100 km/h and that of a front vehicle is 50 km/h, and in the other, the running speed of this vehicle is 100 km/h and that of a front vehicle is 0 km/h (stopped). According to the prior art, since both cases are the same in the running speed (100 km/h) of this vehicle, braking is started when the vehicle-to-vehicle distance reaches a value (assumed to be 50 m) which has been determined beforehand in accordance with the running speed of this vehicle. In the former case, braking is started at a time point of 3.60 seconds up to collision, and in the latter case, braking is not started until when the time up to collision is 1.80 second. Thus, as long as judgment is made on the basis of the time up to collision, there is a great unevenness in the time point at which braking is started. This indicates a discrepancy from the actual driving sense.

On the other hand, according to the present invention, if a preset value $T_1$ of an estimated time up to collision in the former case is 3.60 seconds (distance from the front vehicle: 50 m), braking can be started when the estimated time Tx has become 3.6 seconds even in the latter case where the front vehicle is stopped, that is, braking can be started at the time when the distance from the front vehicle is 100 m (50 m in the prior art).

Also in actual driving, the driver drives his vehicle while grasping the state of a front vehicle, and when the front vehicle is braked suddenly or is stopped, the driver of this vehicle applies the brake at a relatively long distance. According to the present invention, a braking action can be exhibited in a state close to such actual driving sense.

Even when the estimated time Tx up to collision is larger than $T_1$, if it is smaller than $T_0$, a warning is issued to call the driver's attention, thereby permitting a smooth braking operation to be performed by the brake pedal 1.

Further, since pre-pressurizing (see FIG. 2) is conducted simultaneously with the issuance of a warning, it is possible to improve the response characteristic of actual braking. More particularly, the time $T_1$ may be set at an extremely short time lest the automatic braking system should operate in a too early stage, but in order to ensure braking in such a short time, it is necessary to improve the response characteristic of the system. Also when the driver applies the brake by depressing the brake pedal 1 after the issuance of a warning, it is necessary to perform a prompt braking operation because the estimated time Tx up to collision is smaller than $T_0$, and hence improving the response characteristic of the system is advantageous.

Although in the above embodiments the obstacle is a front vehicle, even when the obstacle is such a stationary structure as a guardrail, the automatic brake control system of the present invention is applicable effectively. In this case, like the case where the front vehicle is stopped, braking is started at a fairly longer distance from the obstacle than in the prior art, thus ensuring safety.

According to the automatic brake control system of the present invention, as set forth hereinabove, an estimated time Tx up to contact with an obstacle such as a front vehicle is determined on the basis of a relative velocity Vs which also takes into account the moving speed of the obstacle, and braking is performed in accordance with the estimated time Tx, so even when the running speed of this vehicle is constant, braking is conducted if Tx is small, even at a long distance X, thus permitting a braking operation to be carried out in a state close to the actual driving sense, whereby a safe braking method can be provided.

According to the present invention, moreover, even when braking is performed using an automatic braking system, it is possible to call the driver's attention in a succeeding vehicle because stop lamps come on and hence possible to enhance the safety of running vehicles.

What is claimed is:

1. An automatic brake control system comprising:
   a distance sensor for detecting the distance between a front obstacle and a vehicle to be controlled:
   a brake pressure controller for controlling the application of pressure, holding of pressure and reduction of pressure for a hydraulic brake fluid in a wheel cylinder of said vehicle; and
   a control section which inputs a signal from said distance sensor, performs an arithmetic processing and outputs a control signal to said brake pressure controller,
   said control section calculating a distance X between said vehicle and said obstacle on the basis of the signal provided from said distance sensor, calculating a relative velocity Vs with respect to said obstacle from changes of X with time, determining an estimated time Tx which will be taken until contact with said obstacle, from both Vs and X, and outputting a control signal for the execution of braking in accordance with the value of the estimated time Tx;
   said control section storing reference times $T_0$ and $T_1$ ($T_0 > T_1$), actuating said brake pressure controller to pressurize the wheel cylinder for applying the brake when said estimated time Tx is smaller than both reference times $T_0$ and $T_1$, and calling a driver's attention by blinking a lamp or issuing a warning sound when said estimated time Tx is smaller than the reference time $T_0$ and larger than the reference time $T_1$;
   said control section pre-pressurizing the wheel cylinder to create a light drag state of the brake when said estimated time Tx is smaller than the reference time $T_0$ and larger than the reference time $T_1$.

2. An automatic brake control system according to claim 1, wherein said control section calculates a relative acceleration V's together with the relative velocity Vs, further calculates a relative velocity $Vs_2$ at an elapsed time point of the estimated time Tx as a rear-end collision estimated time when the value of the relative acceleration V's is positive, and actuates said brake pressure controller to pressurize the wheel cylinder for applying the brake when the value of the relative velocity $Vs_2$ is positive.

3. An automatic brake control system according to claim 1, wherein said control section outputs a stop lamp actuating signal at the time of outputting the control signal to said brake pressure controller so that a stop lamp in the rear of said vehicle is activated by either depression of a brake pedal or said stop lamp actuating signal.

4. An automatic brake control system according to claim 1, wherein when the estimated time Tx is smaller than the reference time $T_0$ and larger than the reference time $T_1$, a judgment is made as to whether a brake pedal is depressed or a steering operation is performed to a predetermined degree, and the braking is released when either of said operations is performed.

5. An automatic brake control system including:
a distance sensor for detecting the distance between a front obstacle and a vehicle to be controlled;
a brake pressure controller for controlling the application of pressure, holding of pressure and reduction of pressure for a hydraulic brake fluid in a wheel cylinder; and
a control section which inputs a signal from said distance sensor, performs an arithmetic processing and outputs a control signal to said brake pressure controller;
said control section holds two reference times $T_0$ and $T_1 (T_0 > T_1)$, and calculating a distance X between the vehicle to be controlled and the obstacle on the basis of the signal provided from said distance sensor, then calculating a relative victory $V_s$ with respect to the obstacle from changes of X with time, determining an estimated time $T_x$ which will be taken until contact with the obstacle, from both $V_s$ and X, and actuates said brake pressure controller to pressurize the wheel cylinder for applying the brake when the estimated time $T_x$ is smaller than both reference times $T_0$ and $T_1$, and pre-pressurizes the wheel cylinder to create a light drag state of the brake when the estimated time $T_x$ is smaller than the reference time $T_0$ and larger than the reference time $T_1$.

6. An automatic brake control system according to claim 5, wherein said control section calls a driver's attention by blinking of a lamp or by issuing a warning when the estimated time $T_x$ is smaller than the reference time $T_0$ and larger than the reference time $T_1$.

7. An automatic brake control system according to claim 5, wherein said control section outputs a stop lamp actuating signal at the time of outputting the control signal to said brake pressure controller.

* * * * *